Nov. 1, 1949.                M. F. PRAVDA                2,486,573

THERMOSTATICALLY CONTROLLED VALVE

Filed Jan. 21, 1947

INVENTOR.
MILTON F. PRAVDA
BY
Kwis, Hudson, Boughton & Williams
ATTORNEYS

Patented Nov. 1, 1949

2,486,573

UNITED STATES PATENT OFFICE 2,486,573

THERMOSTATICALLY CONTROLLED VALVE

Milton F. Pravda, Bedford, Ohio, assignor to The Cleveland Research Corporation, Cleveland, Ohio Application January 21, 1947, Serial No. 723,299

9 Claims. (Cl. 236—87)

1

This invention relates to a thermostatically controlled valve of the type in which a thermal responsive means is employed to control the flow of a fluid in accordance with the ambient temperature of the environment in which the valve is placed.

An object of the invention is to provide a novel and improved valve mechanism for controlling the flow of a fluid in response to the ambient temperature of the environment of the valve, the mechanism being adjustable for operation at a selected temperature within a given range and being so constructed as to be especially useful as a wall-type thermostatic control for a heating system.

Another object of the invention is to provide an improved fluid flow controlling mechanism comprising a normally open valve, the said valve being enclosed within a casing and operated from the exterior thereof by a bimetallic means when the latter reaches a predetermined ambient temperature, the valve being sealed from the external operating mechanism to prevent leakage thereabout.

A further object of the invention is to provide an improved fluid flow controlling device comprising a casing forming a chamber provided with inlet and outlet openings, a flexible diaphragm extending across the casing with the inlet and outlet openings on one side thereof, and an actuating member extending exteriorly of the casing on the other side of the diaphragm, the actuating member being adapted to be engaged by a bimetallic member when the latter reaches a predetermined ambient temperature to exert force through the actuating member upon the flexible diaphragm and thereby control the communication between the inlet and outlet passages.

A still further object of the invention is to provide a fluid flow controlling device of the type mentioned in the preceding object in which a normally open valve is provided for the inlet opening and the actuating means is located in substantial alignment with the valve but on the opposite side of the diaphragm therefrom.

It is also an object of the invention to provide a fluid flow controlling device of the type mentioned in the preceding objects with improved means for adjusting the device to operate at a predetermined temperature, together with improved means for zeroizing or calibrating the device.

It is also an object of the invention to provide an improved thermostatically controlled valve, the operation of which is entirely mechanical in nature and is so constructed and arranged that a relatively large movement of the bimetallic means thereof is secured by a compact and efficient mechanism.

The invention further resides in certain novel features, details of construction, and combination and arrangement of parts, and further objects and advantages thereof will be apparent to those skilled in the art to which it pertains from the following detailed description of the preferred embodiment thereof, described with reference to the accompanying drawing in which similar reference characters represent corresponding parts throughout the several views and in which.

The thermostatically controlled valve or fluid flow controlling device of this invention is so designed as to be capable of varying and/or terminating the flow of fluids such as gas, oils, or the like in response to changes in ambient temperature of the environment in which the valve is located. While the device is not limited thereto, it is particularly useful for employment as a wall-type thermostat for controlling the flow of gas, or the like, to a heating system in accordance with the room temperature and, therefore, the preferred form of the invention will be described in detail with particular reference to such a use thereof. It is to be understood, however, that many of the features of the invention may be employed in other environments and for other purposes.

Figure 1:
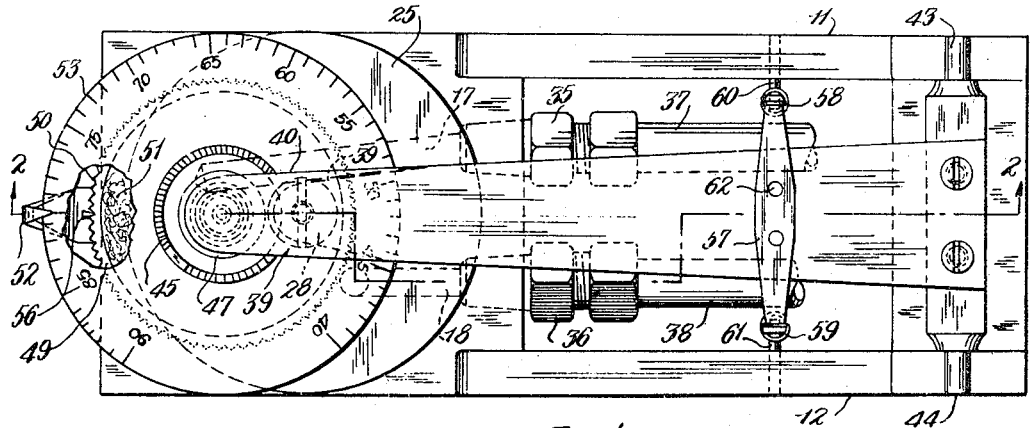
Fig. 1 is a top plan view of the improved thermostatically controlled valve of this invention with the casing removed and with a portion of the calibrated regulating disk broken away to show a portion of the zeroizing disk.
Figure 2:
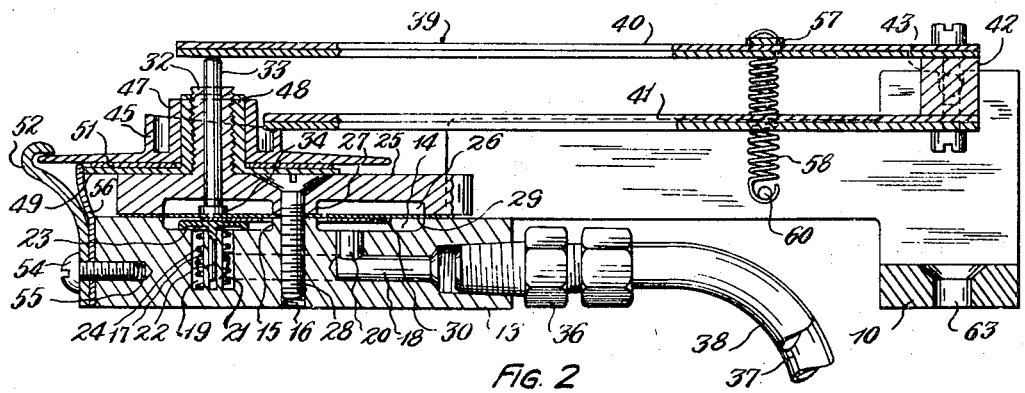
Fig. 2 is a view partly in section and partly in elevation, the view being taken on the irregular section line 2—2 of Fig. 1 and looking in the direction indicated by the arrows.
Figure 3:
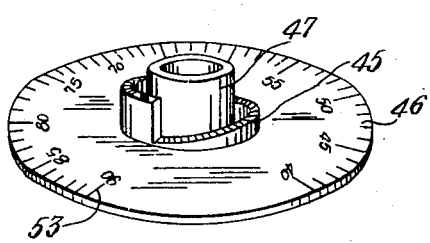
Fig. 3 is a perspective view of the novel calibrated regulating disk of the improved device.
Figure 4:
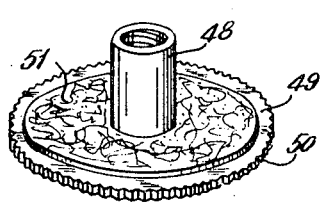
Fig. 4 is a perspective view of the novel zeroizing disk of the improved device.
Figure 5:
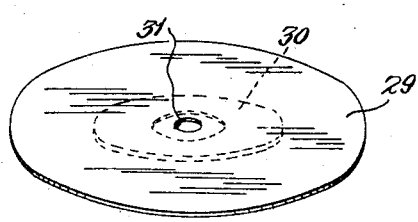
Fig. 5 is a perspective view of the diaphragm employed in the improved valve, the diaphragm reinforcing plate being indicated in dotted lines.

In Figs. 1 and 2 of the drawing there is illustrated a fluid flow controlling device, or thermostatically controlled valve, constructed in accordance with this invention for use as a wall-type thermostat to control the supply of fuel to a heating system, the device being illustrated as turned on its side with respect to the position in which it would normally be mounted. In the embodiment illustrated, the device comprises a base plate 10 and spaced, substantially parallel, upstanding side members 11 and 12 which may be formed integrally with the base or attached thereto by any conventional means. These side members 11 and 12 are substantially T-shaped with one side of the cross member of the T joined to the base 10 and with the central portions of the T extending longitudinally of the device, their outer ends being integral with, or joined to, a member or plate 13 constituting one part of a two-part casing or housing forming the chamber for the valve mechanism.

As will be seen in Fig. 2, the upper face of the plate 13 is provided with an annular recess 14, at the center of which is an upstanding, substantially circular, boss or projection 15, the top surface of the latter being substantially coplanar with the top surface of the plate 13. Extending centrally through the boss 15 is a threaded bore 16 for a purpose hereinafter described. The plate 13 is also provided with two spaced, longitudinally extending, passageways or bores 17 and 18 forming inlet and outlet passages, respectively, for the fluid to be controlled by the device. The inner ends of these bores 17 and 18 terminate at substantially equal radial distances from the center of the bore 16 but upon opposite sides thereof, the inner ends of the bores communicating with the recess 14 at the top of the plate by vertically extending openings 19 and 20, respectively.

The opening 19 is substantially annular in configuration and is provided with a centrally located boss 21, which is centrally bored to receive the cylindrical extension or guide portion 22 of a valve 23. The valve 23 is preferably disk-shaped with a diameter considerably larger than that of the opening 19 and has a recess on the face which is directed towards the said opening 19. This latter recess and the cylindrical boss 21 provide a guiding and retaining means for a coil spring 24 which normally tends to hold the valve 23 away from the bottom of the recess 14 so that there is free communication between the inlet opening 17 and the recess 14.

The top of the valve chamber is formed by a substantial disk-like plate 25 which has an annular recess 26 formed on the underside thereof and provided with a central boss 27, which is bored and counterbored to receive a screw 28, the latter screwing into the threaded opening 16 to retain the top plate 25 upon the bottom plate 13. The recess 26 and boss 27 are so shaped that when the plate 25 is positioned upon the plate 13, the resulting annular chamber, formed by the recesses 14 and 26, is substantially symmetric about the dividing line constituted by the top and bottom surfaces, respectively, of the plates 13 and 25. Before thus assembling the two plates, a flexible diaphragm member 29, which may be constructed of relatively thin fluid-impervious material such as metal, gold-beaters' skin or the like, is inserted therebetween. This diaphragm preferably has an annular disk, or plate, 30 affixed to the lower surface and concentric about a central opening 31 therethrough. The diameter of the central opening in the annular reinforcing disk 30 is greater than the diameter of the bosses 15 and 27 of the housing or casing, and the outside diameter of the annular disk 30 is less than the outer diameter of the annular recesses 14 and 26. Hence, when the diaphragm is positioned between the plates 13 and 25 and the screw 28 is then inserted and threaded into the opening 16, the plate 25 will be firmly clamped to the plate 13 with the outer periphery of the flexible diaphragm 29 clamped therebetween and constituting a gasket or seal. The complementary bosses 15 and 27 of the housing will engage the portion of the diaphragm surrounding the screw 28 and clamp the diaphragm therebetween. When thus assembled, the reinforcing or backing plate 30 is disposed substantially concentric about the bosses 15 and 27, and its lower face is in engagement with the top of valve 23.

The upper plate 25 of the housing or casing member is provided with an integral upstanding projection or boss 32 which is externally threaded, the boss also being provided with a coaxial bore communicating with the recess 26. Disposed within this bore or opening is a valve actuating member or pin 33 which is substantially cylindrical and has its lower end provided with an enlarged disk-like portion 34 resting upon the top surface of the diaphragm 29. The projection or boss 32 is preferably so positioned that the pin or actuating member 33 is substantially coaxial with the valve 23, and the backing or reinforcing plate 30 is of sufficient size so that a portion of its periphery is interposed between the valve 23 and the lower portion 34 of the valve actuating member.

The outer ends of the inlet and outlet openings 17 and 18 are suitably threaded and provided with pipe nipples 35 and 36, respectively, to which inlet and outlet pipes 37 and 38 are respectively connected by means of suitable couplings or the like. It will be seen, therefore, that gas or other fluid flowing through the pipe 37 will be conducted through the passage 17 to the opening 19 and will pass out the top of the latter and past the valve 23 into the chamber 14, it being remembered that the spring 24 normally holds the valve 23 open. The gas, or other fluid, then flows from the recess or chamber 14 through the bore or opening 20, and the passage 18, to the outlet pipe 38 from whence it may be conducted to the point of use.

This flow of gas or other fluid may be restricted or completely terminated by moving the actuating member or pin 33 inwardly within the opening in the boss 32, the head 34 of the pin then exerting force upon the diaphragm 29 and backing plate 30 to move the valve 23 inwardly against the action of its spring 24 an amount corresponding to the movement of the actuating member or pin. If the latter be moved its maximum distance, the valve 23 will seat upon the surface of the recess 14, as illustrated in Fig. 2, thus completely stopping the flow of gas or other fluid. Actuation of the pin 33 to a lesser extent will simply reduce the flow of the fluid. It will be observed that by this construction the valve 23 and the inlet and outlet openings are all located on the same side of the diaphragm 29 which acts as a gasket or sealing means to prevent leakage of the fluid from the chamber. The pin or actuating means operates from the other side of the diaphragm by exerting force therethrough, and hence there is no need for moving parts extending exteriorly of the casing and into the fluid to be controlled with resultant sealing difficulties and/or likelihood of leakage thereabout.

By providing the chamber in the form of an annular recess, the centrally located bosses 15 and 27 provide support for the center portion of the flexible member or diaphragm 29, thus reducing the stresses thereon adjacent its outer periphery. Moreover, by locating the valve and the actuating member on one side of the recess, closing of the valve is effected by a tilting of the flexible member or diaphragm so that the volume of the space below the diaphragm is not materially changed. This is advantageous because the fluid pressure within the recess is not altered by movement of the diaphragm as would be the case if actuation were in a manner to cause the diaphragm to act as a piston or the wall of a bellows. This elimination of pressure changes produces a more uniform and accurate valve actuation.

Operation of the valve described above is controlled by means of a thermal responsive member herein illustrated as constituted by a bimetallic element or means generally designated 39. This bimetallic means may take a variety of forms, but as here shown comprises two cantilever arms 40 and 41 each formed of two metals having dissimilar coefficients of thermal expansion welded together, with the metal having the lower coefficient of expansion located on the lower side of the upper arm 40 and on the upper side of the lower arm 41. Hence, when the bimetallic means is heated, the two arms will tend to curve toward each other. These two arms of the bimetallic means are rigidly mounted upon the upper and lower surfaces, respectively, of a block or bar 42, the outer ends of which are provided with trunnions 43 and 44 received within substantially U-shaped slots or openings provided at the upper end of the T-shaped side members 11 and 12, respectively. The block 43 and the bimetallic arms 40 and 41 are therefore mounted for rocking about the trunnions 43 and 44 as an axis.

The arms 40 and 41 are of slightly different lengths, the arm 40 preferably being the longer and adapted to extend above the actuating member or pin 33. The lower bimetallic arm 41 is adapted to have its inner end ride upon a helical cam 45 formed as a ring concentric with and spaced from the axis of a calibrated regulating disk 46. The disk is journaled by means of a central upstanding cylindrical collar 47 positioned within the cam 45, the collar having a bore therethrough of a diameter such as to permit it to be freely sleeved upon a cylindrical collar 48 formed integrally with or attached to a zeroizing disk 49. The interior of the collar 48 of the zeroizing disk 49 is threaded to cooperate with the threads upon the cylindrical boss 32 of plate 25, the disk 49 being adapted to moved longitudinally of the boss 32 when rotated thereabout. To facilitate rotation of the zeroizing disk 49, its periphery is milled or serrated as at 50 providing a plurality of notches or grooves. The disk 49 is spaced from the calibrated setting or regulating disk 46 by a disk of leather or other suitable material 51.

A stationary pointer or indicator 52 is provided for cooperation with calibrations 53 on the disk 46. This pointer or indicator may be any desired type but is here shown as formed by a curved arm extending from an edge of the plate or lower casing member 13 upwardly and over the top of the disk 46, the upper end of the pointer having a V-shaped point or the like for cooperation with the calibrations 53. The pointer 52 is retained upon the plate or casing member 13 by means of a screw 54 which is screwed into a threaded bore 55 in the plate 13. The screw 54 may also serve to secure a spring detent arm 56 to the plate or casing member 13, the arm 56 being preferably positioned between the pointer 52 and the plate. The upper end of this detent arm is so shaped as to engage the notch or notches provided by the serrations 50 on the zeroizing disk 49 to thereby hold the latter from rotation. Each calibration corresponds to a different portion of the inclined surface of the cam 45. Hence, when a calibration is aligned with pointer 52, that calibration is indicative of the valve operating temperature of the arm 40 since the arm 41 will then rest upon the corresponding portion of the cam with consequent rocking of the bimetallic arms about the trunnions 43, 44.

A bar 57 extends transversely over the top surface of the bimetallic arm 40 intermediate the ends thereof with the outer ends of the bar connected to the upper ends of coiled springs 58 and 59, respectively, the lower ends of the said springs being connected to pins or studs 60 and 61 extending inwardly from the side members 11 and 12. The function of the bar 57 and the springs 58, 59 is to exert sufficient force upon the bimetallic means 39 to insure continuous engagement of the lower arm 41 thereof with the inclined surface of the helical cam 45. In order to retain the bar 57 in proper position upon the top of arm 40, one or more positioning means may be provided. In the illustrated embodiment, this is effected by one or more pins 62 carried by one of the members and passing through cooperating openings in the other.

The base 10 of the device may be provided with one or more bores or openings 63 to facilitate mounting the device upon a wall or other supporting surface. Also, the device will ordinarily be enclosed by a cover or casing, not here shown, which will be provided with suitable openings or will be otherwise formed so as to expose a portion of the disk 56 for adjustment thereof, the said casing also having openings or louvers to permit the free circulation of air. Such casings are well known in the art and hence need not be illustrated or described in detail.

In operation, the thermostatically controlled valve, or fluid flow regulator, constructed in accordance with this invention will normally be installed upon a wall of a room in a house or the like, and suitable pipe connections, such as 37 and 38, will be joined to the inlet and outlet openings 17 and 18, respectively. The device will then be set for operation at a desired temperature. This is effected by manually turning the calibrated disk 46 until the graduation 53 corresponding to the desired temperature is in alignment with the end of pointer 52. If this temperature be above that existing in the room at the time, the lower arm 41 of the bimetallic member will be elevated as the helical cam is rotated thereunder to the desired setting, and the entire bimetallic means 39 will rock about its trunnions 43 and 44 so that the arm 40 will be elevated above the upper end of the actuating member 33. This will permit the valve spring 24 to force the valve 23 to an open position, the diaphragm 29 flexing slightly to permit this movement. Fluid such as gas or the like will then flow from the inlet 17 through the chamber or recess 14 to the outlet 18 and thence to a burner or other fluid operated device placed at any desired location. When the temperature of the room has reached a value corresponding to that represented by the calibration in alignment with the pointer 52, the bimetallic arms 40 and 41 will curve towards each other. The springs 58 and 59, however, will maintain the lower arm 41 in continuous engagement with the helical cam 45 and hence the upper arm 40 will press downwardly upon the actuating member or pin 33, moving the latter inwardly so that the enlarged portion 34 thereof will exert force through the diaphragm 29 and backing plate 30 to overcome the force of the spring 24 and close the valve 23. If desired, the strength of the spring 24 and other parts of the thermostatically controlled valve as well as the operation of the burner or other equipment with which the device is employed may be so designed that the valve 23 is not completely closed until the predetermined temperature has been exceeded by a certain amount. For example, the spring 24 may be relatively stiff and the springs 58, 59 relatively weak so that the valve 23 is not completely closed until the bimetallic arms are at a temperature above the predetermined temperature at which time the increased flexing of the arms has increased the force exerted by the springs 58 and 59 sufficiently to overcome the force of the spring 24 with resulting complete closing of the valve. A similar result is achieved with a relatively weak spring 24 by simply adjusting the zeroizing disk 49 axially outwardly with respect to the casing. Hence, the valve or flow regulator of this invention may be employed either as an "on-off" device or as a means to regulate the volume of flow with a full on and off operation as well.

In the event it be discovered that the operation of the thermostatically controlled valve does not correspond with the temperature existing in the room, the apparatus may be zeroized or adjusted by moving the spring detent 56 from engagement with the serrations 50 on the disk 49 and manually turning the latter in the proper direction to correct the operation of the valve, holding the disk 46 stationary at the same time. As the disk 49 is so rotated, the threads in the collar 48 thereof, cooperating with the threads on the boss 32, will move the disk 49 axially; and, since the disk 46 is supported upon the disk 49, the former will likewise be moved thereby and thus alter the distance that the outer ends of the bimetallic means 39 must move to operate the valve for a given setting of disk 46. When the device has been so zeroized or regulated, the spring detent 56 is released to again engage the serrations 50 and thus hold the disk 49 from rotation when the calibrated disk 46 is moved.

It will be apparent that the improved valve or flow regulator herein disclosed may be operated by a thermal responsive means constructed otherwise than as represented. For example, suitable operation can be obtained by a single arm of bimetallic material having one end fixedly mounted and the other adapted to operate the actuating member 33. However, by employing the construction herein shown and described, the desired amount of movement of the end of the bimetallic member may be secured in one-half the space required if the member be a single arm.

It will also be apparent that the movement imparted to the valve by the thermal responsive means can be utilized for effecting opening of the valve as well as, or in place of, controlling the closing thereof. Thus, by properly positioning the low expansion sides of the bimetallic members, the valve may be normally closed and opened only when a predetermined temperature has been reached. Moreover, the fluid flow which is controlled by the improved valve or flow regulator may be of sufficient volume for direct supply to a burner or the like, or may be a flow which is in turn employed to operate a diaphragm valve or other mechanical device for controlling fluid flow or performing other tasks.

Other modifications, adaptations and arrangements of parts will be readily apparent to those skilled in the art and, therefore, the invention is not to be considered as restricted to the exact construction of the preferred embodiment herein illustrated and described but only as required by the spirit and scope of the appended claims.

Having thus described my invention, I claim:

1. A device of the character described comprising a casing forming a chamber provided with inlet and outlet openings, a valve in said casing adapted to close one of said openings, means normally biasing said valve to open position, a fluid-tight flexible sealing means extending across said chamber and secured to said casing in sealing relationship with the inlet and outlet openings and the valve all on one side thereof, a valve actuating member on the other side of said sealing means and guided by an opening in said casing for straight-line movement, the said member having a portion adapted to exert force through said sealing means in a direction to close said valve, a reinforcing member secured to a portion of said sealing means and extending between said valve and said valve actuating member, and a bimetallic means positioned exteriorly of said casing and having a portion thereof adapted to cooperate with said valve actuating member to move the latter, said chamber and reinforcing member being substantially annular with the said sealing means secured to the casing at its center and periphery, the outer diameter of said reinforcing member being less than the diameter of said chamber and the inner periphery of the reinforcing member being spaced from the point at which the center of the sealing means is secured, whereby the sealing means and reinforcing member are tilted when engaged by said valve actuating member so that the volume of the space between the sealing means and the inlet and outlet openings remains substantially constant.

2. A device of the character described comprising a casing forming a chamber provided with inlet and outlet openings, a valve in said chamber for terminating the communication between the inlet and outlet openings, a valve actuating means extending exteriorly of said casing through an opening in the latter, means on said casing rotatably supporting a helical cam concentric with said actuating member and with the outer end of the latter extending above the said cam, and thermal responsive means for operating said actuating member including a pair of spaced substantially parallel bimetallic arms disposed with their sides having the lower coefficient of expansion facing in opposite directions, one end of each of said arms being connected to a rockably mounted support, the other end of one of said arms resting upon the inclined surface of said helical cam and the other of said arms extending over the outer end of said actuating member to engage and move the latter in response to a change in temperature, and means for maintaining said one arm in continuous engagement with the inclined surface of said cam whereby rotation of the latter conditions the thermal responsive means to actuate said valve at different preselected temperatures.

3. A device of the character described comprising a casing forming a chamber and provided with inlet and outlet openings, valve means in said casing to regulate communication between said inlet and outlet openings, a valve actuating member extending exteriorly of said casing, a bimetallic means including a pair of substantially parallel vertically spaced arms each formed of dissimilar metals with their sides having the lower coefficient of expansion disposed adjacent each other, the said arms each having one end rigidly connected to a rockably mounted support, the other end of the lower of the two arms resting upon an adjustable support, the upper of said arms extending over the said actuating member and adapted to operate the latter when the bimetallic means reaches a predetermined temperature, the said adjustable support comprising a substantially disk-like member rotatably mounted coaxially with said actuating member and provided with a cam surface upon which the said lower arm rests, means for maintaining said one arm in continuous engagement with the cam surface so that rotation of the latter conditions the bimetallic means to actuate the said valve at different preselected temperatures, the said disk-like member also being provided with a plurality of calibrations each corresponding to a different portion of said cam and indicative of the operating temperature of the bimetallic means when the said one arm is resting upon the corresponding portion of the cam, and a stationary pointer cooperating with said calibrations to indicate the operating temperature to which the bimetallic means has been adjusted.

4. A device of the type defined in claim 3 and further comprising means to axially move said disk-like member whereby the operating temperature indicated thereby will correspond with the actual operating temperature of the bimetallic means.

5. A device of the character described comprising a two-part casing having a recess interiorly thereof bounded by cooperating planar surfaces of the two parts of the casing and cooperating planar surfaces on the said two parts of the casing positioned substantially centrally of said recess, a fluid-tight flexible diaphragm extending across said recess and clamped between the said cooperating planar surfaces of the two parts of the casing so that the diaphragm is firmly secured both adjacent the periphery of the recess and substantially centrally thereof, one of said casing parts being provided with inlet and outlet openings normally communicating through said recess on one side of said diaphragm, a valve member positioned in said recess and cooperating with one of said openings for effecting closing of the latter, means normally biasing said valve to open position, a valve actuating member slidably guided in and extending through an opening in the other part of said two-part casing, a reinforcing member in the form of an annular ring lying against said diaphragm in substantially concentric relation to the centrally secured portion of the diaphragm, the said actuating member having a portion adapted to engage the said diaphragm eccentrically to said centrally secured portion but within the area of said reinforcing member and to exert force through the diaphragm by tilting of said reinforcing member in a direction to close said valve, and a means positioned exteriorly of said casing and having a portion cooperating with said valve actuating member to move the latter and thereby operate said valve.

6. A device of the character described comprising a two-part casing having a recess interiorly thereof bounded by cooperating planar surfaces of the two parts of the casing and cooperating planar surfaces on the said two parts of the casing positioned substantially centrally of said recess, a fluid-tight flexible diaphragm extending across said recess and clamped between the said cooperating planar surfaces of the two parts of the casing so that the diaphragm is firmly secured both adjacent the periphery of the recess and substantially centrally thereof, one of said casing parts being provided with inlet and outlet openings normally communicating through said recess on one side of said diaphragm, a valve member positioned in said recess and cooperating with one of said openings for effecting closing of the latter, means normally biasing said valve to open position, a valve actuating member slidably guided in and extending through an opening in the other part of said two-part casing, a reinforcing member in the form of a flat annular ring secured to said diaphragm with the periphery of said reinforcing member spaced from the side walls of said recess and with a portion of the reinforcing member extending between said actuating and valve members, the said actuating member having a portion adapted to engage the said diaphragm and exert force therethrough and through the reinforcing member by tilting of the latter in a direction to close said valve, and a means positioned exteriorly of said casing and having a portion cooperating with said valve actuating member to move the latter and thereby operate said valve.

7. A device as defined in claim 6 and in which the said recess and reinforcing member are substantially annular with the inner and outer peripheries of said reinforcing member spaced from the adjacent side walls of the recess whereby the diaphragm and the reinforcing member are tilted when engaged by said valve actuating member under the influence of the means for moving the latter so that the volume of the portion of the recess between the diaphragm and the inlet and outlet openings remains substantially constant.

8. A device of the character described comprising a two-part casing having a recess interiorly thereof bounded by cooperating planar surfaces of the two parts of the casing and cooperating planar surfaces of the said two parts of the casing positioned substantially centrally of said recess, a fluid-tight flexible diaphragm extending across said recess and clamped between the said cooperating planar surfaces of the two parts of the casing so that the diaphragm is firmly secured both adjacent the periphery of the recess and substantially centrally thereof, one of said casing parts being provided with inlet and outlet openings normally communicating through the said recess on one side of said diaphragm, a valve member positioned in said recess and cooperating with one of said openings for effecting closing of the latter, means normally biasing said valve to open position, a valve actuating member slidably guided in and extending through an opening in the other part of said two-part casing, a reinforcing member in the form of an annular ring lying against said diaphragm in substantially concentric relation to the centrally secured portion of the diaphragm, the said actuating member having a portion adapted to engage the said diaphragm eccentrically to said centrally secured portion but within the area of said reinforcing member and to exert force through the diaphragm by tilting of said reinforcing member in a direction to close said valve, a bimetallic means including a pair of substantially parallel vertically spaced arms each formed of dissimilar metals with their sides having the lower coefficient of expansion disposed adjacent each other, the said arms each having one end rigidly connected to a rockably mounted support, the other end of the lower of the two arms resting upon an adjustable support, the upper of said arms extending over the said actuating member and adapted to operate the latter when the bimetallic means reaches a predetermined temperature, said adjustable support comprising a substantially disk-like member rotatably mounted coaxially with said actuating member and provided with a cam surface upon which the said lower arm rests, and means for maintaining said one arm in continuous engagement with the cam surface whereby rotation of the latter conditions the bimetallic means to actuate said valve at different preselected temperatures.

9. A device of the type defined in claim 8 and in which the disk-like member is provided with a plurality of calibrations each corresponding to a different portion of the cam surface and indicative of the operating temperature of the bimetallic means when the said one arm is resting upon the corresponding portion of the cam surface, a stationary pointer cooperating with said calibrations to indicate the operating temperature to which the bimetallic means has been adjusted, and means to axially move said disk-like member whereby the operating temperature indicated thereby will correspond with the actual operating temperature of the bimetallic means.

MILTON F. PRAVDA.

REFERENCES CITED

The following references are of record in the file of this patent:

UNITED STATES PATENTS

| Number | Name | Date |
|---|---|---|
| 547,461 | Short | Oct. 8, 1895 |
| 554,398 | Powers | Feb. 11, 1896 |
| 624,046 | Johnson | May 2, 1899 |
| 991,064 | Houser | May 2, 1911 |
| 1,466,243 | Neal | Aug. 28, 1923 |
| 1,985,100 | Kuhn | Dec. 18, 1934 |
| 2,171,272 | Kronmiller | Aug. 29, 1939 |
| 2,192,633 | Beam | Mar. 5, 1940 |
| 2,280,345 | Nickells | Apr. 21, 1942 |
| 2,310,594 | Osburn | Feb. 9, 1943 |

FOREIGN PATENTS

| Number | Country | Date |
|---|---|---|
| 23,138 | Great Britain | 1901 |